United States Patent
Henderickx et al.

(10) Patent No.: US 12,188,492 B1
(45) Date of Patent: Jan. 7, 2025

(54) METHOD OF CHARGING A BELLOWS ACCUMULATOR

(71) Applicant: DRiV Automotive Inc., Northville, MI (US)

(72) Inventors: Jonas Henderickx, Hasselt (BE); Kenny Berwaerts, Muizen (BE)

(73) Assignee: DRIV Automotive Inc., Northville, MI (US)

( * ) Notice: Subject to any disclaimer, the term of this patent is extended or adjusted under 35 U.S.C. 154(b) by 0 days.

(21) Appl. No.: 18/515,477

(22) Filed: Nov. 21, 2023

(51) Int. Cl.
*F15B 1/08* (2006.01)
*B60G 17/04* (2006.01)

(52) U.S. Cl.
CPC ............ *F15B 1/08* (2013.01); *B60G 17/0424* (2013.01); *F15B 2201/205* (2013.01); *F15B 2201/415* (2013.01)

(58) Field of Classification Search
CPC ...... F15B 1/08; F15B 1/103; F15B 2201/205; F15B 2201/3153; F15B 2201/41; F15B 2201/411; F15B 2201/415
See application file for complete search history.

(56) References Cited

U.S. PATENT DOCUMENTS

| | | | |
|---|---|---|---|
| 4,858,898 A | 8/1989 | Niikura et al. | |
| 4,997,009 A | 3/1991 | Niikura et al. | |
| 5,771,936 A * | 6/1998 | Sasaki | F16L 55/053 |
| | | | 138/30 |
| 6,622,755 B2 * | 9/2003 | Weber | F15B 1/22 |
| | | | 138/30 |
| 6,892,765 B2 * | 5/2005 | Kamimura | F15B 1/22 |
| | | | 138/30 |
| 7,108,016 B2 | 9/2006 | Moskalik et al. | |
| 9,377,031 B2 * | 6/2016 | Miyake | F15B 1/103 |
| 10,323,746 B2 | 6/2019 | Endo et al. | |
| 10,532,527 B2 | 1/2020 | Kloft et al. | |
| 10,914,323 B2 * | 2/2021 | Arikawa | F15B 1/083 |

(Continued)

FOREIGN PATENT DOCUMENTS

| | | |
|---|---|---|
| DE | 1922070 A1 | 11/1970 |
| JP | H08166001 A | 6/1996 |

(Continued)

*Primary Examiner* — Thomas E Lazo
(74) *Attorney, Agent, or Firm* — Harness, Dickey & Pierce, P.L.C.

(57) ABSTRACT

A method of charging a bellows accumulator for a vehicle suspension system comprises providing an outer shell with an accumulator port and a gas charging port, and inserting a bellows assembly within the outer shell. The bellows assembly includes an annular bellows wall at least partially defining a gas chamber of variable volume. The bellows assembly is axially extendable between a retracted position and a fully extended position. The gas chamber is arranged in fluid communication with the gas charging port. An accumulation chamber is provided between the outer shell and the bellows assembly and is in fluid communication with the accumulator port. The method further includes evacuating the accumulation chamber when the bellows assembly is not at the fully extended position to obtain a pressure within the accumulation chamber less than atmospheric pressure and supplying pressurized gas to the gas charging port.

20 Claims, 5 Drawing Sheets

(56) References Cited

U.S. PATENT DOCUMENTS

| | | | |
|---|---|---|---|
| 2004/0154694 A1* | 8/2004 | Trzmiel | F15B 1/103 |
| | | | 141/113 |
| 2004/0250866 A1 | 12/2004 | Bartsch et al. | |
| 2015/0240839 A1* | 8/2015 | Mizukami | F16L 55/053 |
| | | | 138/31 |
| 2019/0360503 A1* | 11/2019 | Arikawa | F15B 1/083 |
| 2019/0368513 A1* | 12/2019 | Arikawa | F15B 1/103 |
| 2022/0034334 A1* | 2/2022 | Baltes | F15B 1/103 |

FOREIGN PATENT DOCUMENTS

| | | | |
|---|---|---|---|
| JP | 2000249101 A | 9/2000 | |
| JP | 2000352497 A | 12/2000 | |
| JP | 2001079660 A | 3/2001 | |
| JP | 2001082401 A | 3/2001 | |
| JP | 3889370 B2 | 3/2007 | |
| JP | 4131063 B2 | 8/2008 | |
| JP | 4264738 B2 | 5/2009 | |
| JP | 2010174985 A | 8/2010 | |
| JP | 4550402 B2 | 9/2010 | |
| JP | 2012097829 A | 5/2012 | |

\* cited by examiner

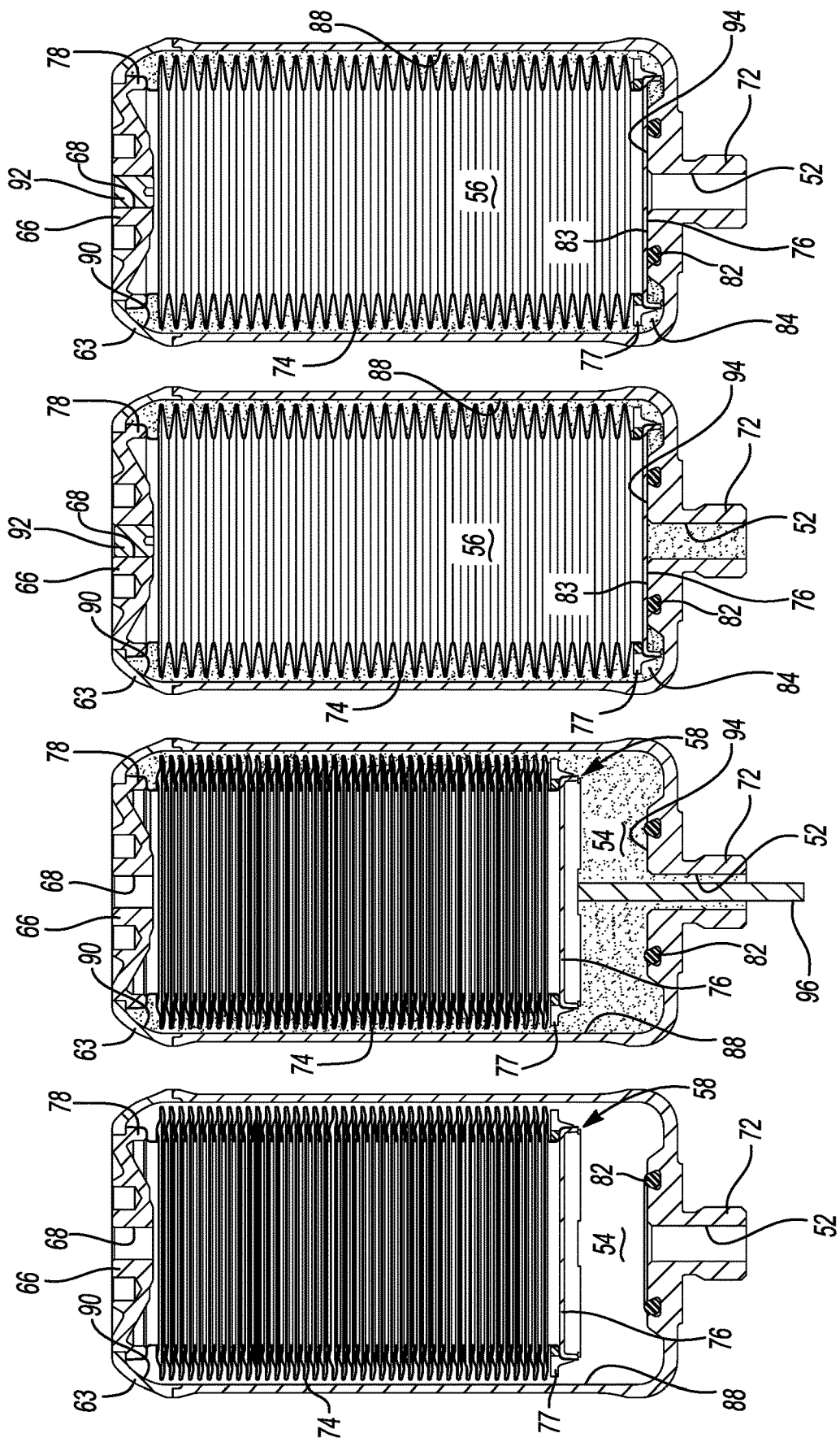

METHOD OF CHARGING A BELLOWS ACCUMULATOR

FIELD

The present disclosure relates generally to a vehicle suspension assembly technique. More particularly, the disclosure describes a method of pressurizing or charging a bellows accumulator associated with a hydraulic damping system.

BACKGROUND

This section provided background information related to the present disclosure which is not necessarily prior art.

To improve ride and handling characteristics of a vehicle, it is often beneficial to equip the vehicle with a suspension system operable to absorb loads input to the vehicle as it travels over a road surface, during cornering, braking and acceleration. In order to dissipate the energy associated with the vehicle traveling over bumps and recesses in the road surface, dampers are generally connected between a body and a suspension of the vehicle.

Suspension systems including the aforementioned dampers not only attempt to control reactions to road loads at each wheel end but also function to improve the overall handling and safety of the vehicle. Undesirable vehicle roll may occur during corning operations and pitch may occur under deceleration and acceleration of the vehicle. Roll and pitch moments may adversely affect tire adhesion, cornering performance, braking performance and may be uncomfortable to the driver and passengers.

Existing suspension systems may be equipped with mechanical torsion bars to counteract roll or pitch tendencies. More recently, fluid control systems have been implemented to hydraulically interconnect two or more dampers located on the vehicle. At least some fluid control systems are equipped with one or more accumulators. The accumulator often includes a pressurized gas chamber and an accumulation chamber that supplies and receives a working fluid to a hydraulic system including the dampers. Several types of accumulators have been constructed including bladder accumulators, piston accumulators, and bellows accumulators.

In a bellows accumulator, a bellows defines an internal pressurized gas chamber. The bellows may extend and retract within a housing based on the pressure of the fluid in the hydraulic system on which the pressurized gas chamber acts. The pressurized gas provides a positive pressure inside the bellows that will force working fluid out of the accumulator when fluid pressure in the accumulation chamber is less than the gas pressure inside the pressurized gas chamber. Typically, accumulators are preassembled and charged with pressurized gas before they are installed on or otherwise connected to a damper or suspension system. Unfortunately, damage to the bellows may occur prior to or during vehicle installation if a differential pressure condition exists between the gas filled chamber and the accumulation chamber. For instance, a bellows damage risk exists during initial pre-charging of the accumulator during accumulator manufacture. Additionally, or alternatively, the bellows may be undesirably deformed during a procedure filling the vehicle suspension system with fluid at a vehicle build site. Further opportunity for bellows damage exists when charging the hydraulic system on a vehicle or possibly during suspension servicing operations. Differential pressure conditions may also exist during extreme handling events of the vehicle.

Bellows that have been undesirably deformed may exhibit significantly lower fatigue life than desired. As such, it may be advantageous to assure that the bellows maintains its proper shape and that the corrugations or pleats of the bellows are not undesirably deformed during a condition where the pressure within the bellows is significantly different than the pressure outside of the bellows.

Some procedures for accumulator assembly may include supplying fluid to the accumulation chamber prior to the accumulator being assembled to the suspension system or vehicle. Later, when the accumulator is being attached to the vehicle or a time immediately prior, residual fluid within the accumulation chamber may leak from the housing causing an unwanted contamination of the workspace.

Accordingly, a need exists for an improved method of charging a bellows accumulator to assure simple assembly and robust operation.

SUMMARY

A method of charging a bellows accumulator for a vehicle suspension system comprises providing an outer shell with an accumulator port and a gas charging port, and inserting a bellows assembly within the outer shell. The bellows assembly includes an annular bellows wall at least partially defining a gas chamber of variable volume. The bellows assembly is axially extendable between a retracted position and a fully extended position. The gas chamber is arranged in fluid communication with the gas charging port. An accumulation chamber is provided between the outer shell and the bellows assembly and is in fluid communication with the accumulator port. The method further includes evacuating the accumulation chamber when the bellows assembly is not at the fully extended position to obtain a pressure within the accumulation chamber less than atmospheric pressure and supplying pressurized gas to the gas charging port.

In another arrangement, a method of charging a bellows accumulator for a vehicle suspension system comprises providing an outer shell and providing a bellows assembly including an annular bellows wall and a plate defining a gas chamber of variable volume. The plate is axially movable between a first position and a second position. The method includes providing an accumulation chamber in fluid communication with the bellows assembly and providing a valve in fluid communication with the accumulation chamber. The valve is in an open condition when the plate is not at the second position and the valve in a closed condition when the plate is at the second position. The method further comprises applying vacuum to the accumulation chamber when the valve is in the open condition and filling the gas chamber with pressurized gas such that the gas chamber contains pressurized gas while vacuum is applied to the accumulation chamber.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6a, 6b, 6c and 6d depict a method of charging the bellows accumulator in accordance with the teachings of the present disclosure.

In the drawings, reference numbers may be reused to identify similar and/or identical elements.

DETAILED DESCRIPTION

Figure 1:
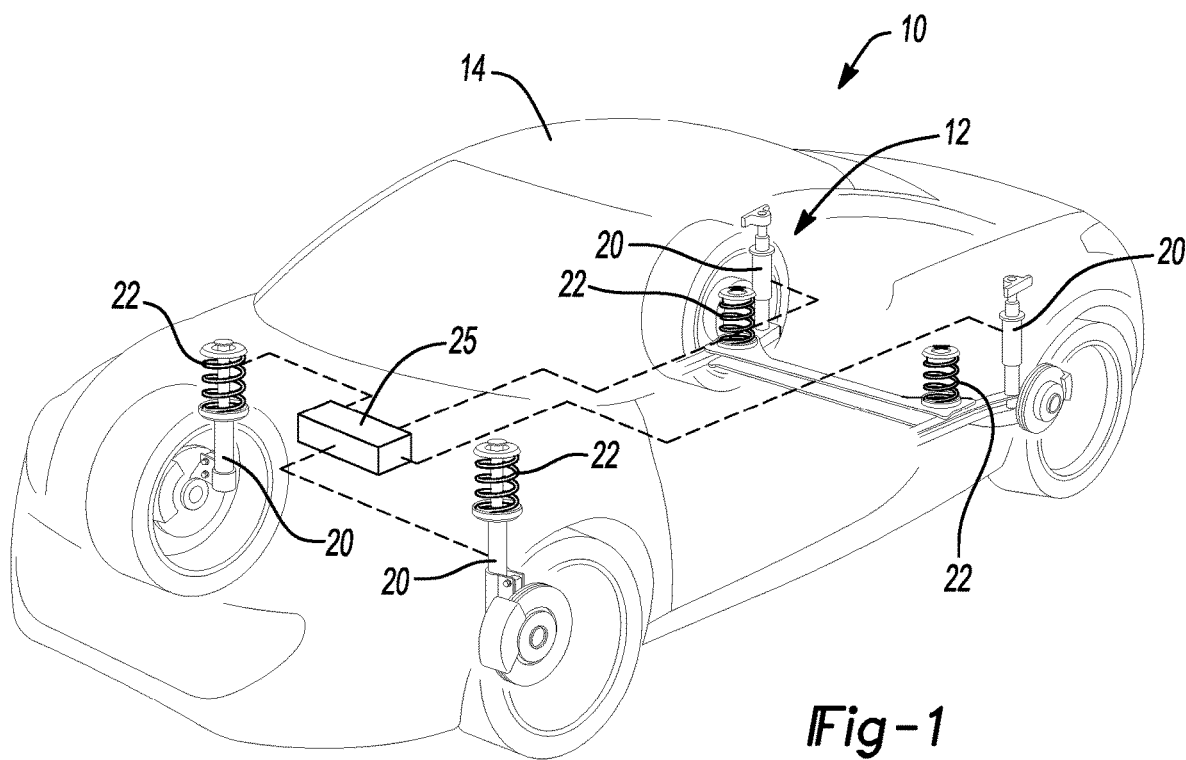
FIG. 1 is a schematic diagram illustrating a vehicle with an exemplary suspension system of the present disclosure.

The present disclosure relates generally to suspension systems for motor vehicles equipped with an accumulator and, more particularly to a method of charging a bellows accumulator.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 10 including a suspension system 12 and a body 14. Suspension system 12 includes dampers 20 and coil springs 22. Dampers 20 may be semi-active with damping levels controlled by an electronic control unit 25. Electronic control unit 25 receives information such as acceleration, displacement, steering angle, brake applications, and vehicle speed from sensors (not shown). Alternatively, it should be appreciated that dampers 20 may be associated with a network of fluid lines and valves (not shown) selectively fluidically interconnected to one another. The network of fluid lines and valves controls damper function to address inputs to the vehicle attempting to induce roll, pitch or other undesirable motions.

Figure 2:
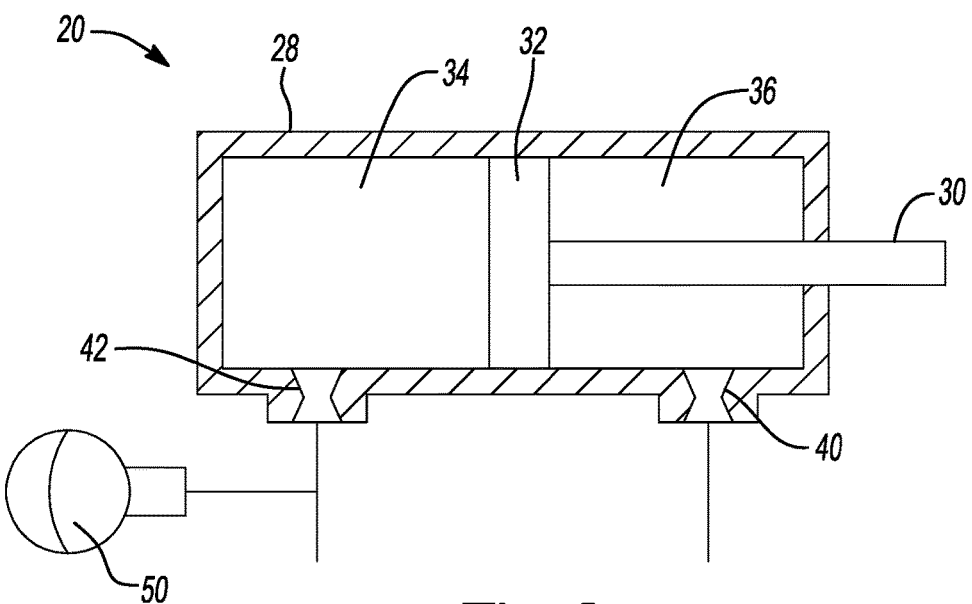
FIG. 2 is a schematic diagram of a portion of an exemplary suspension system including a damper, hydraulic conduits, and an exemplary accumulator.

With reference to FIG. 2, exemplary damper 20 includes a damper housing 28, a piston rod 30, and a piston 32 that is mounted on the piston rod 30. The piston 32 is arranged in sliding engagement with the inside of the damper housing 28 such that the piston 32 divides the damper housing into a compression chamber 34 and a rebound chamber 36. Piston 32 is a closed piston with no fluid flow paths defined within or by its structure. In addition, there are no other fluid flow paths in the damper housing 28 such that fluid is not communicated between the compression and rebound chambers of the damper except through external hydraulic circuits (not shown) via a rebound chamber port 40 and a compression chamber port 42 in damper housing 28.

An accumulator 50 is arranged in fluid communication with the compression chamber port 42. Accumulator 50 may alternatively be positioned in fluid communication with rebound chamber port 40 or a hydraulic line coupled to either of the ports 40, 42. Accumulator 50 defines a variable fluid volume that increases and decreases depending on the fluid pressure within compression chamber port 42.

Figure 3:
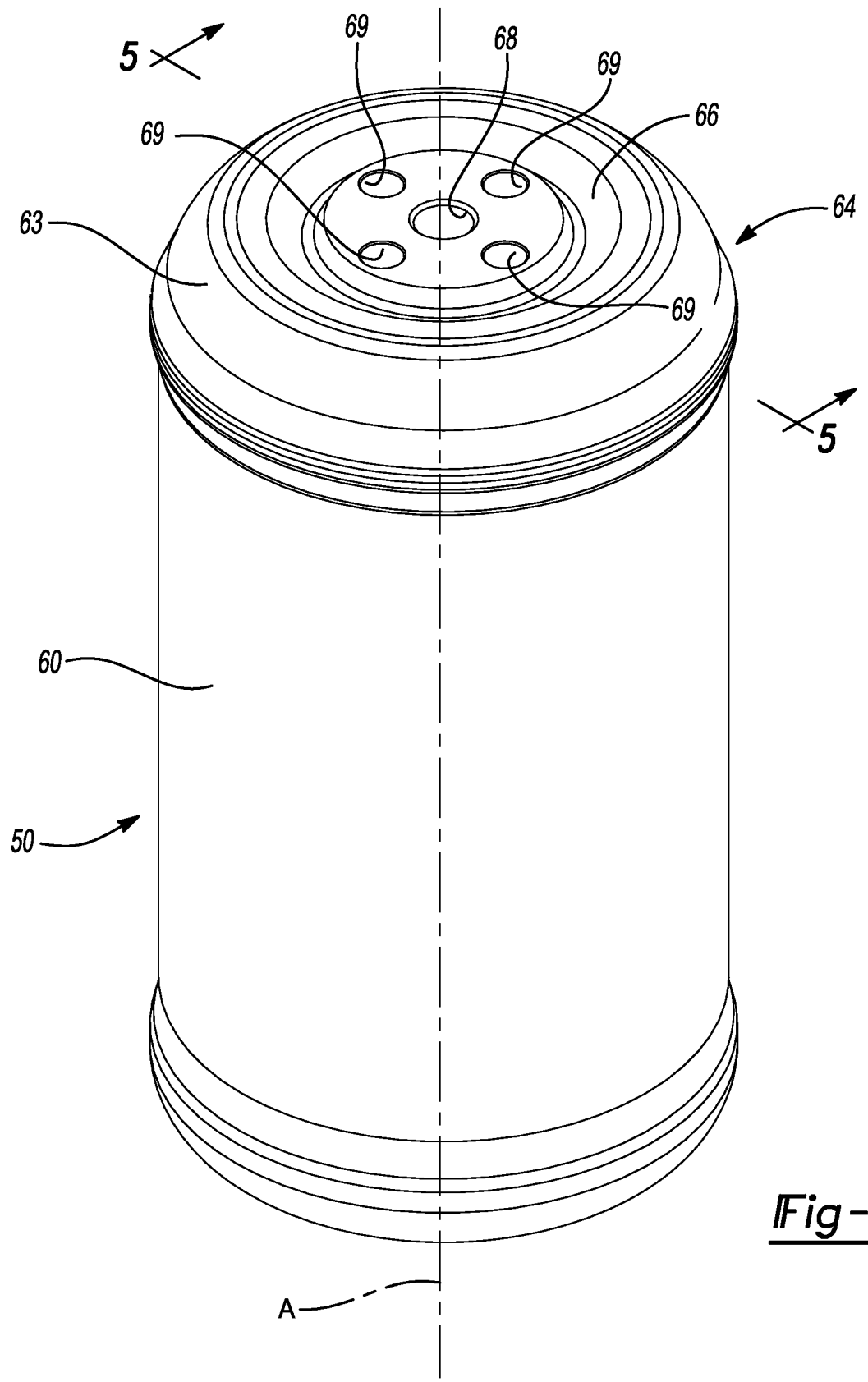
FIG. 3 is a perspective view of an exemplary bellows accumulator constructed in accordance with the teachings of the present disclosure.
Figure 4:
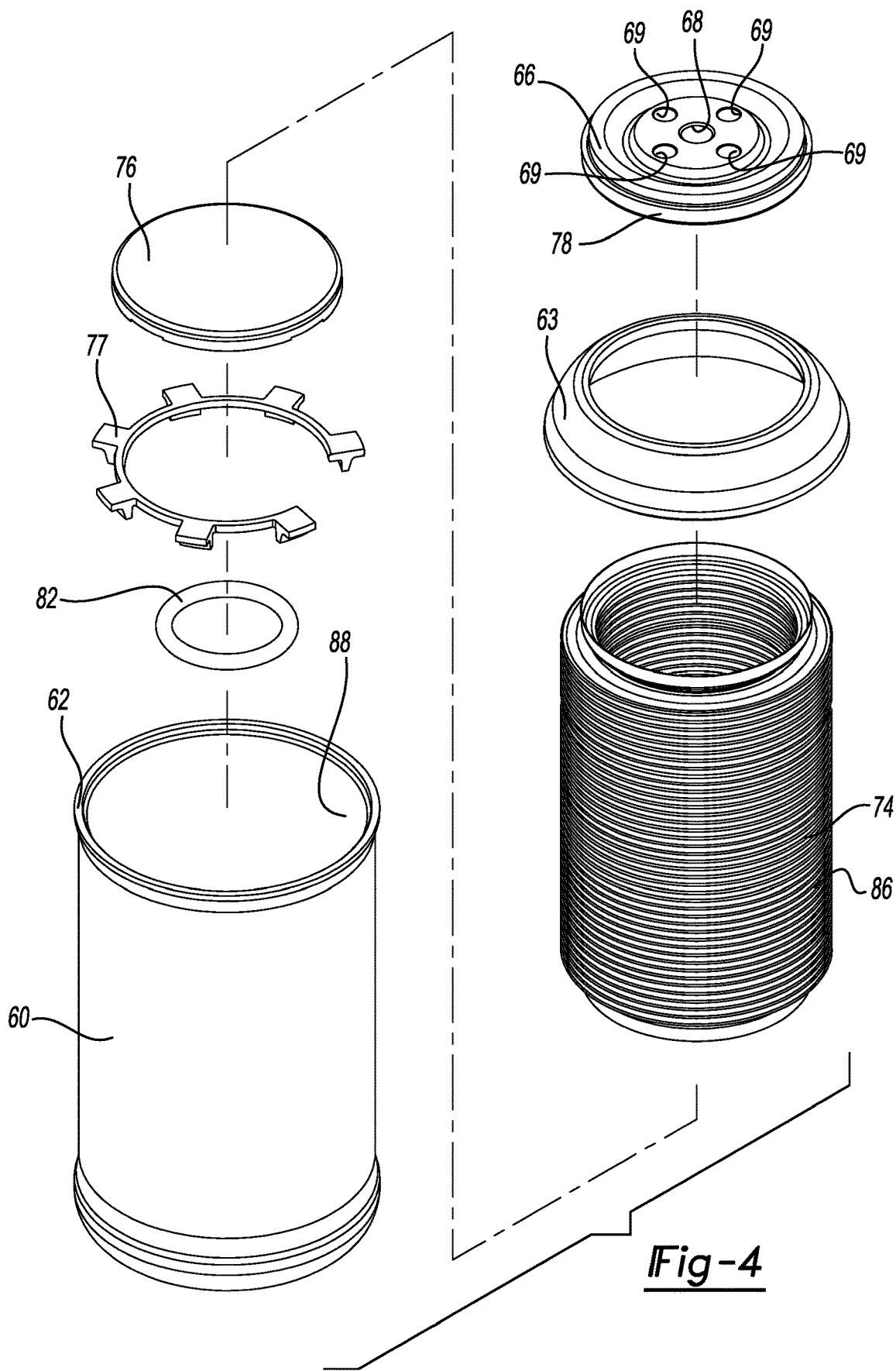
FIG. 4 is an exploded perspective view of the bellows accumulator depicted in FIG. 3.
Figure 5:
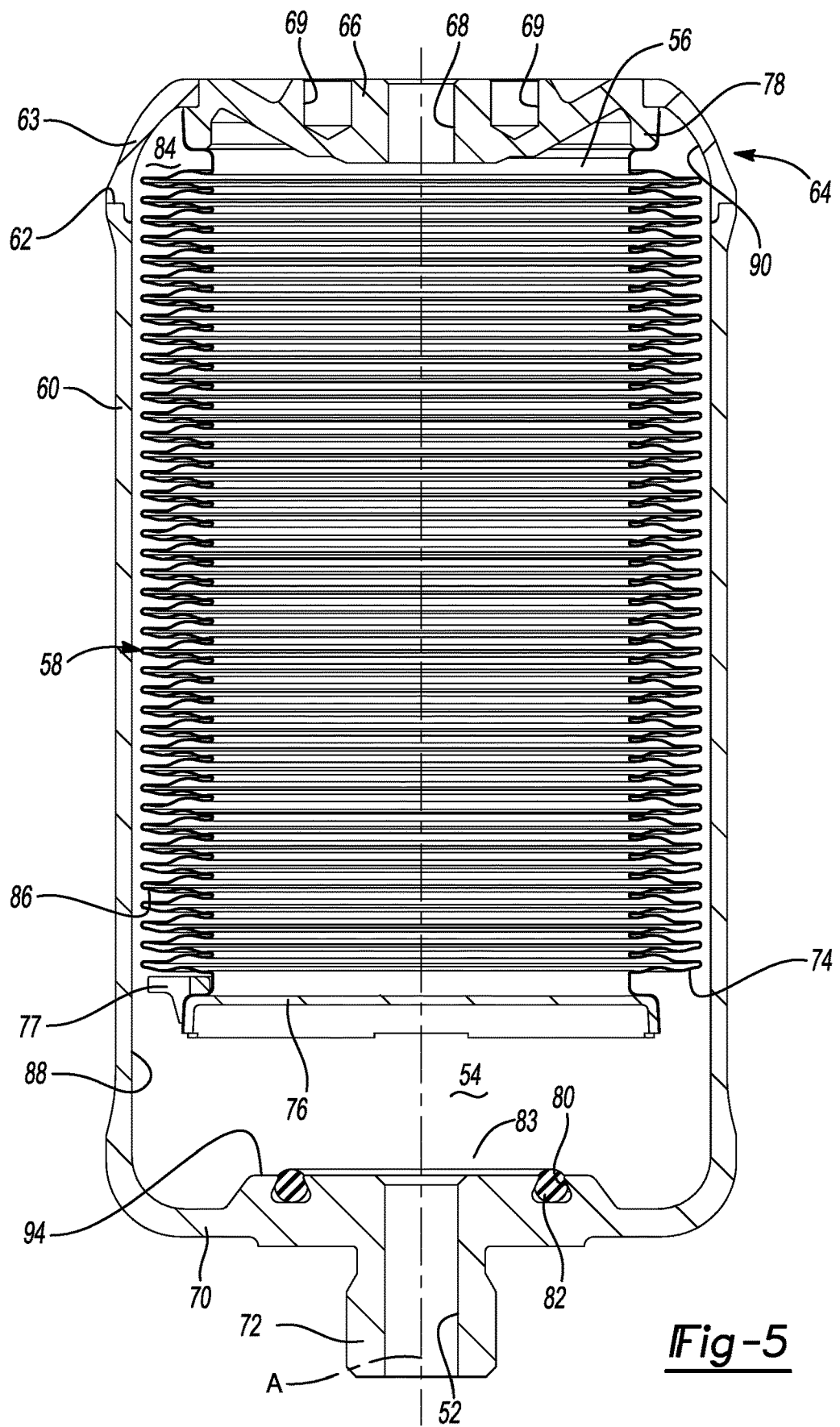
FIG. 5 is a cross-sectional view taken along line 5-5 as shown in FIG. 3.

With reference to FIGS. 3-5, accumulator 50 is configured as a bellows accumulator. Accumulator 50 includes an accumulator port 52 and accumulation chamber 54. It should be appreciated that accumulator 50 may be positioned at any number of physical locations on the vehicle as long as fluid communication occurs between an accumulation chamber 54 of accumulator 50 and a damper port, hydraulic line, or valve of the suspension system. In one example, accumulator 50 is directly fixed to a base of a damper housing (not shown).

Accumulation chamber 54 contains the same working fluid as contained within damper 20 and flowing through the hydraulic lines of a suspension system. Further, accumulator 50 also includes a pressurized gas chamber 56 that is defined by and contained within a bellows assembly 58 that is positioned inside an outer shell 60 of accumulator 50. After completion of a pre-charging procedure described in greater detail below, pressurized gas chamber 56 is filled with a pressurized gas, sealed, and fluidly isolated (i.e., separated) from the accumulation chamber 54. In the illustrated example, accumulation chamber 54 is positioned longitudinally between the pressurized gas chamber 56 and accumulator port 52. However, it should be appreciated that accumulator 50 could be designed with accumulation chamber 54 in an alternative location, such as between pressurized gas chamber 56 and a structural component, a damper, or another portion of outer shell 60.

Bellows assembly 58 is expandable and compressible in an axial direction inside outer shell 60 of accumulator 50 such that the volume of both the accumulation chamber 54 and pressurized gas chamber 56 can increase and decrease with changes to the fluid pressure within accumulation chamber 54.

The pressurized gas inside pressurized gas chamber 56 of accumulator 50 operates to apply a positive pressure inside accumulator 50, which forces fluid out of accumulation chamber 54 when fluid pressure at accumulator port 52 is less than the gas pressure inside pressurized gas chamber 56. In other words, pressurized gas chamber 56 will increase in volume and accumulation chamber 54 will decrease in volume until the pressure equalizes between accumulation chamber 54 and pressurized gas chamber 56. Conversely, when fluid pressure at accumulator port 52 increases, fluid flows into accumulation chamber 54, causing accumulation chamber 54 to increase in volume and pressurized gas chamber 56 to decrease in volume until pressure equalizes.

Outer shell 60 of accumulator 50 is generally cylindrical in shape and extends annularly about an accumulator axis A. Outer shell 60 of accumulator 50 includes an open end 62 that abuts a crown 63 at a distal end 64 of accumulator 50. Crown 63 is sealed and fixed to outer shell 60. A cap 66 is sealed and fixed to crown 63. Cap 66 includes a gas charging port 68 and a plurality of mounting apertures 69. Cap 66 is generally arranged along a transverse plane that is substantially perpendicular to the accumulator axis A. As such, cap 66 of accumulator 50 generally closes off distal end 64 of outer shell 60 apart from an opening provided by gas charging port 68 on distal end 64.

Although other configurations are possible, outer shell 60 of accumulator 50 may be made of metal and includes an integral end wall 70 formed as one-piece with outer shell 60. End wall 70 generally transversely extends relative to accumulator axis A. A nipple 72 axially extends from end wall 70 and includes accumulator port 52. Nipple 72 may be externally threaded to provide a mounting provision for accumulator 50. Apertures 69 may be used as drive sockets for a tool (not shown) to fix nipple 72 to any suitable structure. Other geometrical features may be provided in lieu of or in addition to apertures 69 to apply a torque to outer shell 60 and nipple 72 such as a hexagon shape on cap 66 and milled slots or flats on outer shell 60. It is also contemplated that alternate mounting arrangements such as threaded apertures or axially extending studs may be provided on outer shell 60 such as at end wall 70.

Bellows assembly 58 of accumulator 50 is arranged in a sliding/slip fit inside outer shell 60 and has an annular bellows wall 74, which extends coaxially about the accumulator axis A and axially between cap 66 and a plate 76 of the bellows assembly 58. Plate 76 of bellows assembly 58 has a disc shape and an outer diameter that is fixed to annular bellows wall 74. A centering ring 77 may be used to align annular bellows wall 74 within outer shell 60 along accumulator axis A. Centering ring 77 minimizes the likelihood that bellows assembly 58 will contact an inner surface 88 of outer shell 60. Cap 66 includes an annular flange 78 that is fixed to annular bellows wall 74 at distal end 64. Together, annular bellows wall 74, cap 66 and plate 76 of bellows assembly 58 cooperate to define pressurized gas chamber 56 within accumulator 50. Annular bellows wall 74 has a corrugated shape, which allows bellows assembly 58 to expand and contract in length (i.e., the distance between cap 66 and plate 76 of bellows assembly 58 can increase or decrease) depending on the pressure differential between the accumulation chamber 54 and the pressurized gas chamber 56.

As best shown in FIG. 5, end wall 70 includes a groove 80 in receipt of a seal 82. Plate 76 and seal 82 form a valve 83 that is normally open when plate 76 is not at a fully extended position. Plate 76 engages seal 82 when bellows assembly 58 is in a fully extended position to operate valve 83 in a closed condition and define a vacuum chamber 84 (FIG. 6c) bounded by an external surface 86 of annular bellows wall 74, inner surface 88 of outer shell 60, an inner surface 90 of crown 63 and annular flange 78.

It may be beneficial to evacuate accumulation chamber 54 prior to connecting gas charging port 68 to a source of pressurized gas. As previously mentioned, damage may occur to bellows assembly 58 if a differential pressure condition exists between the gas filled chamber and the accumulation chamber and annular bellows wall 74 is undesirably deformed instead of merely expanded and contracted as intended. FIGS. 6a, 6b, 6c and 6d depict a method of charging accumulator 50 by applying a vacuum to accumulation chamber 54 prior to filling pressurized gas chamber 56 with pressurized gas to minimize the likelihood of damaging annular bellows wall 74.

The accumulator charging method begins at FIG. 6a with accumulator 50 assembled and having accumulator port 52 and gas charging port 68 open to atmosphere. At this time, plate 76 may be spaced apart from seal 82 or may be engaged with it.

At FIG. 6b, a lifting pin 96 is inserted within accumulator port 52 to assure that plate 76 is spaced apart from seal 82 and valve 83 is in an open state. A source of vacuum is supplied to accumulator port 52 such that fluid pressure within accumulation chamber 54 and vacuum chamber 84 is a predetermined magnitude less than atmospheric pressure. As gas charging port 68 is open to atmosphere, the magnitude of pressure within accumulation chamber 54 and vacuum chamber 84 is less than the atmospheric pressure within pressurized gas chamber 56. Once the predetermined magnitude of vacuum is reached, lifting pin 96 is slowly withdrawn from accumulator port 52. The pressure differential created by the vacuum urges bellows assembly 58 toward its fully extended position and places valve 83 in a closed condition. After valve 83 is closed, vacuum remains in vacuum chamber 84 to urge annular bellows wall 74 toward inner surface 88 of outer shell 60.

The accumulator charging process continues as represented in FIG. 6c. Once bellows assembly 58 is positioned as previously described, lifting pin 96 is completely removed and a pressurized gas, such as nitrogen, is supplied to gas charging port 68. Pressured gas chamber 56 now contains pressurized gas at a desired pressure. This gas is the gas it will contain for the life of the accumulator. A plug 92 is positioned within gas charging port 68 to maintain the desired pressure and volume of gas within pressurized gas chamber 56. Low pressure air is contained or otherwise trapped within vacuum chamber 84 based on the pressure differential between the pressurized gas within pressurized gas chamber 56 and the pressure of air previously under vacuum at accumulator port 52. As the pressure of the gas within pressurized gas chamber 56 and any gas at accumulator port 52 is significant, sealing engagement between plate 76 and seal 82 is maintained. Depending on the magnitude of the pressure differential, additional surface area of plate 76 may engage a seat 94 formed on end wall 70. Seal 82 compresses during engagement with plate 76 to allow plate 76 to simultaneously engage seat 94.

It should be appreciated that the process may be varied slightly without departing from the scope of the present disclosure. In particular, it is envisioned that pressurized gas is supplied to pressurized gas chamber 56 after insertion of lifting pin 96 and after vacuum is applied to accumulator port 52 but prior to removal of lifting pin 96. In the alternate process, valve 83 is open when pressurized gas is provided to pressurized gas chamber 56. Pressurized gas enters pressurized gas chamber 56 before bellows assembly 58 is fully extended. Lifting pin 96 is next retracted to allow plate 76 to engage seal 82 and close valve 83.

As shown in FIG. 6d, vacuum is now removed from accumulator port 52 to ready accumulator 50 for installation within a suspension assembly, shipping and handling to a suspension assembly location, shipping to a vehicle assembly location, or transfer to storage awaiting sale. Vacuum remains within vacuum chamber 84.

The method optionally further includes fluidly coupling accumulator 50 to a damper such as damper 20 of FIG. 1, or any hydraulic suspension component or line. Working fluid from the vehicle suspension system is supplied to accumulation chamber 54 via accumulator port 52. Based on the vacuum present within vacuum chamber 84, accumulation chamber 54 and what once was vacuum chamber 84 are efficiently filled with working fluid. Chamber 84 may now be considered oil chamber 84. The method assures that a minimized amount of air is trapped with oil chamber 84. As accumulator 50 is now filled with both pressurized gas and working fluid, accumulator 50 is operable to apply pressure to the working fluid within first compression chamber 34 of damper 20 or any other suitable fluid chamber or conduit based on the stored energy within pressurized gas chamber 56.

During operation of the hydraulic suspension system with accumulator 50, if the pressure present at accumulator port 52 becomes so low that all of the working fluid from accumulation chamber 54 is evacuated, plate 76 engages seal 82 and closes valve 83. Working fluid is trapped within oil chamber 84 and remains pressurized with a nearly equal pressure to gas within pressurized gas chamber 56. Accordingly, a differential pressure condition between pressurized gas chamber 56 and oil chamber 84 is prevented. Nearly equal pressure exists on opposite sides annular bellows wall 74 to prevent damage to bellows assembly 58 during operation/life of accumulator 50.

During the pressurized gas charging portion of the method, annular bellows wall 74 is protected from damage by drawing the annular bellows wall toward inner surface 88 of outer shell 60 prior to and during the gas charging step. This is important because the gas charging step includes providing a relatively rapid inflow of pressurized gas to pressurized gas chamber 56. Since annular bellows wall 74 is proximate to or in engagement with inner surface 88 of outer shell 60 prior to and during the gas charging process step, minimal additional deflection of the bellows wall will occur thereby avoiding damage to the bellows assembly 58.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of charging a bellows accumulator for a vehicle suspension system, the method comprising:
   providing an outer shell with an accumulator port and a gas charging port;
   inserting a bellows assembly within the outer shell, the bellows assembly including an annular bellows wall at least partially defining a gas chamber of variable volume, the bellows assembly being axially extendable between a retracted position and a fully extended position, the gas chamber being arranged in fluid communication with the gas charging port, wherein an accumulation chamber is provided between the outer shell and the bellows assembly, the accumulation chamber being in fluid communication with the accumulator port;
   evacuating the accumulation chamber when the bellows assembly is not at the fully extended position to obtain a pressure within the accumulation chamber less than atmospheric pressure; and
   supplying pressurized gas to the gas charging port.

2. The method of claim 1, further including positioning the bellows assembly toward or at the retracted position but not at the fully extended position prior to supplying pressurized gas to the gas charging port.

3. The method of claim 2, wherein positioning the bellows assembly toward or at the retracted position but not at the fully extended position includes positioning a lifting pin within the accumulator port in engagement with the bellows assembly.

4. The method of claim 3, further including disengaging the lifting pin from the bellows assembly after a predetermined magnitude of vacuum has been obtained within the accumulation chamber.

5. The method of claim 3, further including retracting the lifting pin from the accumulator port after a predetermined magnitude of vacuum has been obtained within the accumulation chamber.

6. The method of claim 1, wherein supplying pressurized gas to the gas charging port provides a pressure differential between the pressurized gas chamber and the accumulation chamber causing the bellows assembly to be urged toward the fully extended position.

7. The method of claim 1, further including providing a seal on one of the bellows assembly and the outer shell, the seal being engaged with the other of the bellows assembly and the outer shell when the bellows assembly is at the fully extended position.

8. The method of claim 1, wherein the bellows assembly includes a plate coupled to the annular bellows wall, the method further including forming a seal between the plate and the outer shell when the bellows assembly is at the fully extended position.

9. The method of claim 1, wherein the suspension assembly further includes a damper, the method further including fluidly coupling the bellows accumulator to the damper and applying a pressure to fluid in the damper from the pressurized gas in the bellows accumulator.

10. The method of claim 1, wherein evacuating the accumulation chamber includes connecting a source of vacuum to the accumulator port.

11. The method of claim 1, wherein supplying pressurized gas to the gas charging port occurs when the bellows assembly is not at the fully extended position.

12. The method of claim 1, further including extending the bellows assembly to the fully extended position after evacuating the accumulation chamber, wherein supplying pressurized gas to the gas charging port occurs when the bellows assembly is at the fully extended position.

13. A method of charging a bellows accumulator for a vehicle suspension system, the method comprising:
providing an outer shell;
providing a bellows assembly including an annular bellows wall and a plate defining a gas chamber of variable volume, the plate being axially movable between a first position and a second position;
providing an accumulation chamber in fluid communication with the bellows assembly;
providing a valve in fluid communication with the accumulation chamber, wherein the valve is in an open condition when the plate is not at the second position and the valve in a closed condition when the plate is at the second position;
applying vacuum to the accumulation chamber when the valve is in the open condition; and
filling the gas chamber with pressurized gas such that the gas chamber contains pressurized gas while vacuum is applied to the accumulation chamber.

14. The method of claim 13, wherein filling the gas chamber with pressurized gas occurs when the plate is at the second position.

15. The method of claim 13, wherein filling the gas chamber with pressurized gas occurs when the plate is not at the second position.

16. The method of claim 13, further including holding the plate at a location not at the second position to keep the valve in the open condition while applying vacuum.

17. The method of claim 16, wherein holding the plate at a location not at the second position is achieved by positioning a lifting pin within the accumulator port in engagement with the bellows assembly.

18. The method of claim 17, further including retracting the lifting pin from the accumulator port after a predetermined magnitude of vacuum has been obtained within the accumulation chamber.

19. The method of claim 17, further including retracting the lifting pin from the accumulator port after filling the gas chamber with pressurized gas.

20. The method of claim 13, wherein the suspension assembly further includes a damper, the method further including fluidly coupling the bellows accumulator to the damper and applying a pressure to fluid in the damper from the pressurized gas in the bellows accumulator.

* * * * *